US010728500B2

(12) United States Patent
Martinez-Heath et al.

(10) Patent No.: US 10,728,500 B2
(45) Date of Patent: Jul. 28, 2020

(54) OBJECT-MANAGED SECURED MULTICAST SYSTEM

(71) Applicants: AT&T Intellectual Property II, L.P., Atlanta, GA (US); AT&T Global Network Services France SAS, Coubevoie (FR); AT&T Intellectual Property I, L.P., Atlanta, GA (US)

(72) Inventors: Miguel Martinez-Heath, East Windsor, NJ (US); Aurelien Bruno, Colomars (FR); Keylor Eng, Seattle, WA (US); Scott Sayers, Jackson, NJ (US)

(73) Assignees: AT&T Intellectual Property I, L.P., Atlanta, GA (US); AT&T Intellectual Property II, L.P., Atlanta, GA (US); AT&T Global Network Services France SAS, Coubevoie (FR)

( * ) Notice: Subject to any disclaimer, the term of this patent is extended or adjusted under 35 U.S.C. 154(b) by 0 days.

(21) Appl. No.: 16/007,167

(22) Filed: Jun. 13, 2018

(65) Prior Publication Data

US 2019/0387199 A1    Dec. 19, 2019

(51) Int. Cl.
*H04N 7/15* (2006.01)
*H04L 29/06* (2006.01)
(52) U.S. Cl.
CPC ............ *H04N 7/15* (2013.01); *H04L 65/403* (2013.01); *H04L 65/4076* (2013.01)
(58) Field of Classification Search
CPC combination set(s) only.
See application file for complete search history.

(56) References Cited

U.S. PATENT DOCUMENTS

| 8,250,360 | B2 | 8/2012 | Winig |
| 9,258,292 | B2 | 2/2016 | Li et al. |
| 9,363,133 | B2 | 6/2016 | Yoakum et al. |
| 9,380,030 | B2 | 6/2016 | Ezell et al. |
| 9,465,948 | B2 | 10/2016 | Abraham et al. |
| 9,584,491 | B2 | 2/2017 | Abuelsaad et al. |
| 9,628,566 | B2 | 4/2017 | Somes et al. |
| 9,794,259 | B2 | 10/2017 | Horn et al. |
| 2012/0291118 | A1* | 11/2012 | Hiramatsu ............. G06F 21/00 726/16 |
| 2014/0068706 | A1 | 3/2014 | Aissi |
| 2014/0366128 | A1 | 12/2014 | Venkateswaran et al. |
| 2014/0373104 | A1 | 12/2014 | Gaddam et al. |
| 2015/0039760 | A1 | 2/2015 | Yoakum |
| 2015/0243150 | A1* | 8/2015 | Kang ..................... G06Q 10/00 340/601 |
| 2016/0373516 | A1* | 12/2016 | Reyes ................. G06F 21/6209 |
| 2017/0249394 | A1 | 8/2017 | Loeb et al. |
| 2019/0306709 | A1* | 10/2019 | Kim .................... H04L 63/0861 |

OTHER PUBLICATIONS

E. Rescorla; "WebRTC Security Architecture"; RTCWEB Internet-Draft; Jun. 2016; 43 pages.

* cited by examiner

*Primary Examiner* — Phung-Hoang J Nguyen
(74) *Attorney, Agent, or Firm* — BakerHostetler (57) ABSTRACT

The system may provide automatic real-time filtering and information object selection, which may occur at the presentation layer. Presentations may be tailored on a per user basis. Users with different security levels can participate in a video conference call at the same time and only view what their security clearance allows.

20 Claims, 8 Drawing Sheets

OBJECT-MANAGED SECURED MULTICAST SYSTEM

BACKGROUND

Secure Web communication protocols provide a way to authenticate clients and servers on the Web and to protect the confidentiality of communication between clients and servers. With many communications taking place over long distance and mediated by technology, there is an increasing awareness of the importance of interception issues and providing communications to only those who are authorized to view or otherwise receive the communication.

A security level within a community of interest may vary considerably. When this community interacts and shares information in real-time, the information should be managed to ensure that the security level of the objects being presented does not exceed that of the lowest level personnel in this community. There is a need to improve on the technology associated with appropriately sharing secured communications.

SUMMARY

Conventionally to share information, users in a community might: 1) match the level of security in a presentation with the lowest security level of the recipient; or 2) set separate meetings based on the security levels of participants. The disclosed system may provide automatic real-time filtering and information object selection at the presentation layer. Presentations may be tailored on a per user basis. For example, users with different security levels can participate in a conference call at the same time and only view or listen what they are allowed to.

In an example, an apparatus may include a processor and a memory coupled with the processor that effectuates operations. The operations may include creating a plurality of digital objects; associating a security level with each of the plurality of digital objects; and multicasting a presentation with the plurality of digital objects, wherein the viewing or listening to the discussion associated with/of each of the plurality of digital objects is based on the security level of the receiving end device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The disclosed system may provide automatic real-time filtering and information object selection at the presentation layer. Online presentations (hereinafter presentations) may include multimedia and may be tailored on a per user basis. For example, users with different security levels can participate in a video or audio conference at the same time and only view or listen what they are allowed to.

Figure 1:
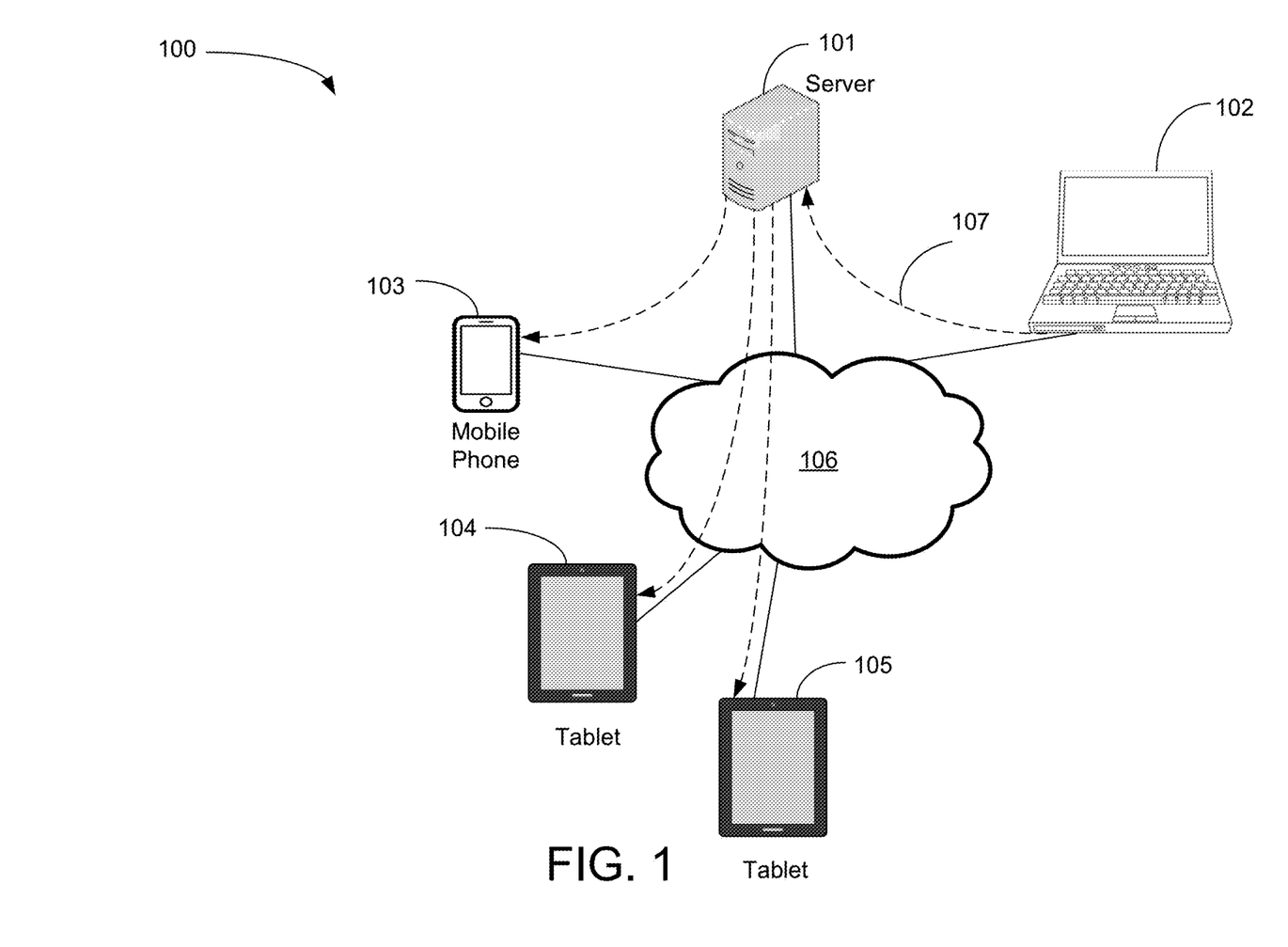
FIG. 1 illustrates an exemplary communication network that may implement object-managed secured multicast.

FIG. 1 illustrates an exemplary communication network that may implement object-managed secured multicast, as disclosed herein. System 100 includes server 101, laptop 102, mobile device 103, tablet 104, and tablet 105 that may be communicatively connected via network 106. Each device in system 100 may be communicatively connected with each other. Server 101 may be web server or the like that may help obtain or generate secure communications between devices of system 100.

Figure 2A:
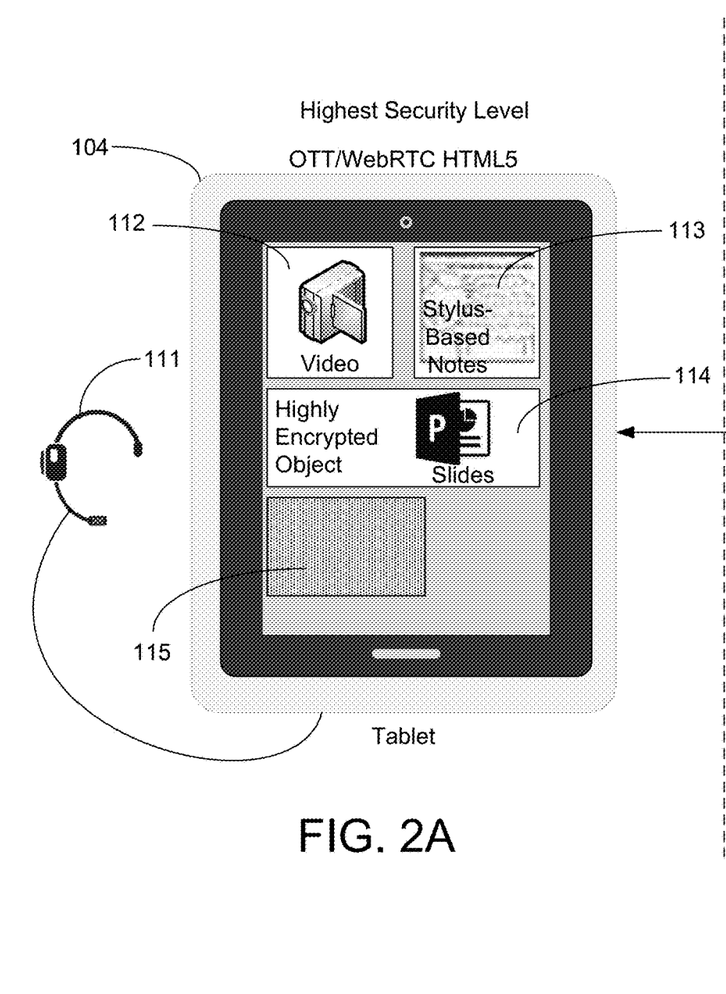
FIG. 2A illustrates an exemplary device that may implement object-managed secured multicast.
Figure 2B:
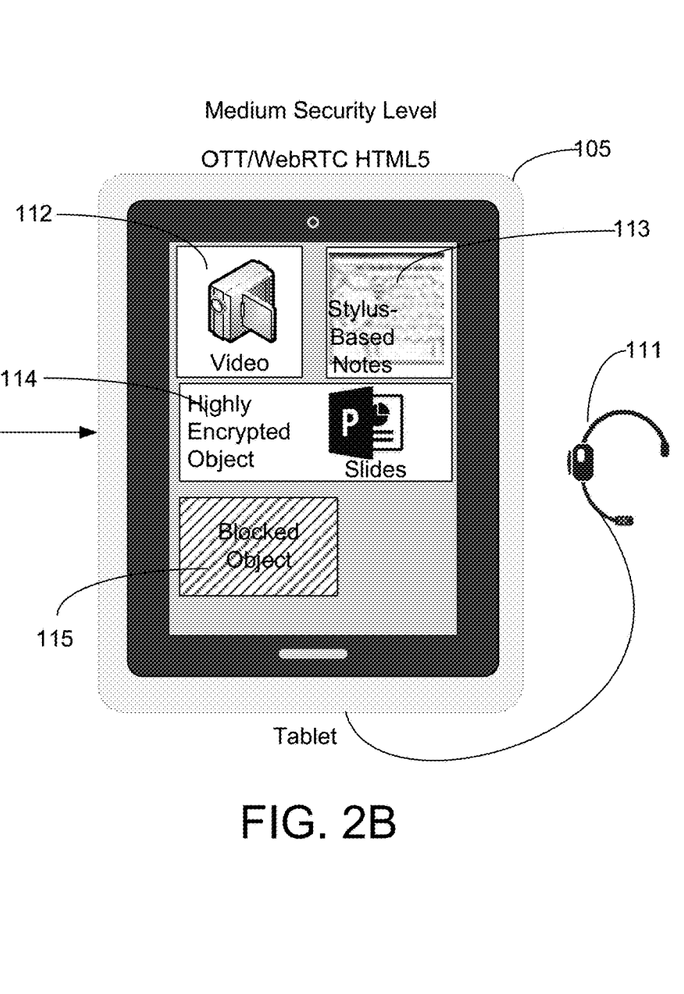
FIG. 2B illustrates an exemplary device that may implement object-managed secured multicast.

FIG. 2A and FIG. 2B illustrate exemplary devices that may implement object-managed secured multicast. As shown, tablet 104 of FIG. 2A and tablet 105 of FIG. 2B. Tablet 104 may have a higher security level (e.g., security level 10 of 10) than tablet 105 (e.g., security level 5 of 10). As disclosed in more detail herein, a security level may be based on different factors. As shown in FIG. 2A and FIG. 2B, each tablet may have multiple digital objects, such as object 112, object 113, object 114, or object 115, among others, which may be categorized as a video object, text-based object (e.g., stylus-based notes), image object (e.g., slides), or the like. Image object more particularly may be particular images on a document (e.g., slide or word processing document), such as particular gifs, jpegs, or the like. It is also contemplated that images (or portions of images) within images may be digital objects capable of being assigned a security level. Image objects may take into account image recognition and attach security level on recognized image (or other multimedia) or attach security level on image (or other multimedia) from a particular file, stylus, finger, or other source. As shown, there may also be object 111 of tablet 104 or tablet 105, which may be audio objects (e.g., headphones or speakers). Audio objects may take into account voice recognition and attach security level on recognized voice (or other audio) or attach security level on voice (or other audio) through a particular microphone. As disclosed herein, there may be dynamic blocking of an object based on a determined security level. It is contemplated herein that the objects may be stacked within each other (e.g., there may be web page that includes objects 112 and 113 or object 114 may include object 112 and 115). Disclosed herein are considerations of attaching security level to output or input of different sources. For example, a first microphone may have a different security level attached to the audio input than a second microphone. Other examples are stylus, files from a particular folder of a computer, or multimedia from different files, among other things. It is also contemplated that if someone places their finger to point to a particular place on a display, the display may attach a security level to the recognized finger (e.g., through fingerprint recognition), and therefore cause the created digital object to have the corresponding security level. The created digital object may be any digital marker, drawing output, pointer, cursor, or the like.

Figure 3:
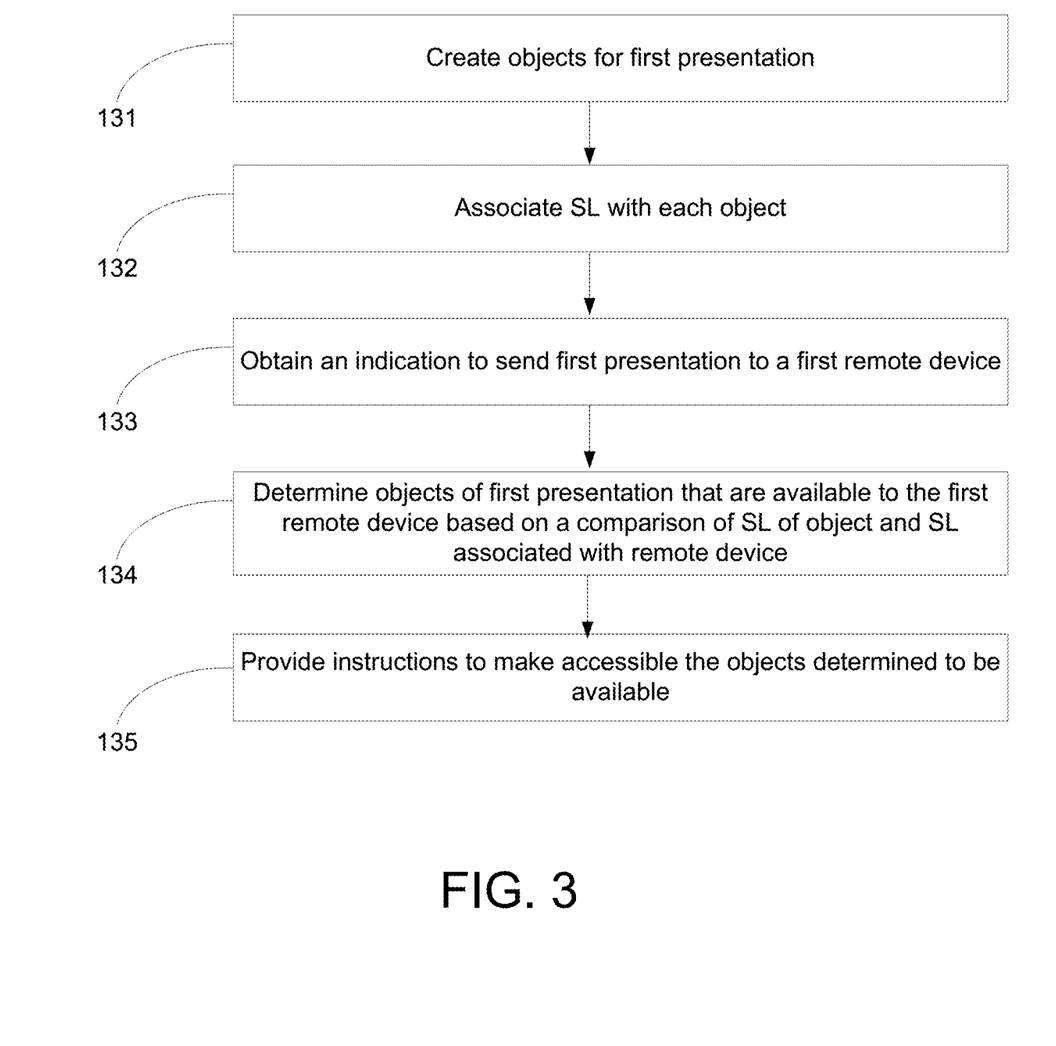
FIG. 3 illustrates an exemplary method for object-managed secured multicast.

FIG. 3 illustrates an exemplary method for object-managed secured multicast. At step 131, objects may be created for a presentation (which may include obtaining digital objects from another source). The presentation may be given or otherwise controlled by a user of laptop 102. Server 101 may facilitate the created presentation. For example, the object may be created on server 101 or otherwise placed on server 101 (e.g., created on laptop 102 and placed on server 101).

At step 132, objects of the presentation that were created at step 131 may be associated with a security level. There may be a minimum security level (or authorization level) set. For example, object 112—object 114 and object 111 may be set to a security level 5 (e.g., minimum security level for the object to be available is security level 5) and object 115 may be set to security level 7. Therefore, if tablet 104 is set to security level 10 then object 111—object 115 are available to tablet 104. Object 115, in this example, is not available to tablet 105. Security levels may be based on factors, such as a determined security clearance of a user of tablet 105 (e.g., based on verified username/password or biometrics), type of device (e.g., mobile phone vs. desktop), geographical location (e.g., White House vs. Afghanistan), or type of network connection (landline vs. wireless), among other things. Although a user may have the highest security clearance, the security level may be adjusted based on the other factors, such as time and near real-time geographical position of tablet 105.

At step 133, an indication may be obtained to send the presentation to a remote device (e.g., mobile device 103, tablet 104, or tablet 105). In an example, server 101 may receive a request message from tablet 105 to enable access to the presentation. The presentation may be multicast to multiple devices. Server 101 may locally filter the objects as necessary (e.g., carve out or otherwise disable objects) before sending to tablet 105 or send a security tag (e.g., as further described herein with regard to FIG. 4), among other things.

At step 134, objects of the presentation that are available to the remote device may be determined based on a comparison (or the like) of the set security level of the objects (e.g., set in step 132) and the security level associated with the remote device. It is assumed, from the example above, that tablet 104 is set to security level 10 and therefore object 111—object 115 are available to tablet 104, while object 115 is not available to tablet 105. Available may mean that the object may mean the following for tablet 105: 1) object 115 is not present all (not displayed on screen in any way); 2) object 115 is blurred or blacked out; 3) object 115 may not allow interaction (e.g., download of additional material or input text responses); or 4) audio in connection with object 115 may be altered or not heard from object 111. In an example, if tablet 105 does not have a security level that allows a certain audio to be played through the headphones, a filler audio related to the presentation may be used until a point in the presentation in which the security level is at the requisite level. The filler audio may be a repeat of information already heard, such as highlights of important things to remember for a mission. This concept of filler audio may be applied to any multimedia (e.g., image, text, etc.). It is contemplated that the security level may change during the presentation (based on the factors) and therefore the availability of objects may change as well.

At step 135, instructions to make accessible the object determined to be available for the device may be provided. Server 101, tablet 105, or other devices may provide the instructions. Server 101 may be the intermediary device that tags or provides authorization or there may be no use of server 101 and just applications. Server 101 (or other the devices) may store or control security tags, information objects, or application programming interfaces (APIs) that may trigger security tag behavior.

The communication 107 for the presentation (which may be any type of audio, text, still image, or video streaming) may leverage, as examples, Web Real-Time Communication (WebRTC) technology or may be an over-the-top (OTT) application. WebRTC provides web browsers and mobile applications with real-time communication (RTC) via simple application programming interfaces (APIs). It allows audio and video communication to work inside web pages by allowing direct peer-to-peer communication, eliminating the need to install plugins or download native apps.

Figure 4:
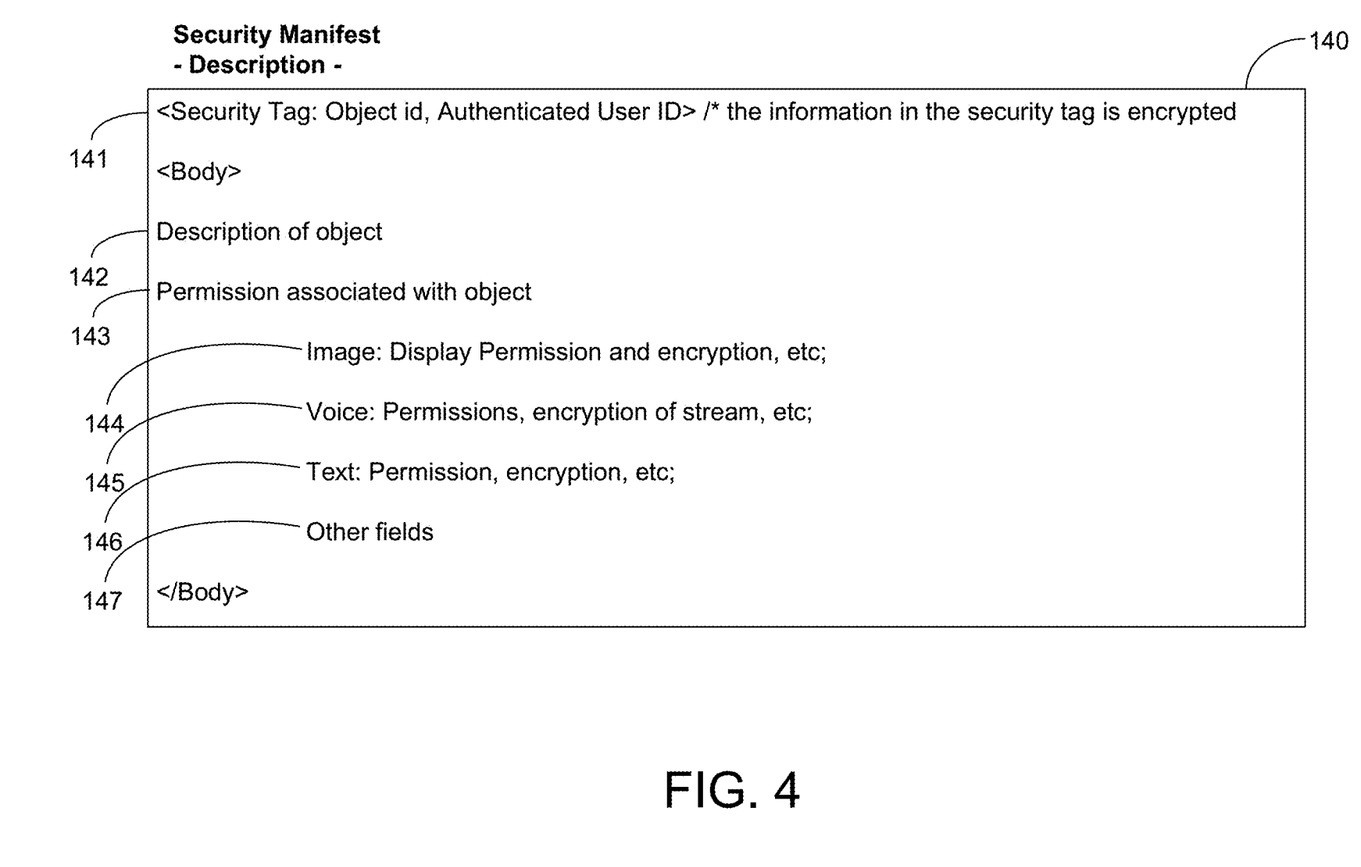
FIG. 4 illustrates an exemplary security manifest for object-managed secured multicast.

As disclosed more generally with reference to FIG. 2-FIG. 3, the secured selection engine in OTT/WebRTC will recognize the entitled security levels of devices associated with a user. The heuristics behind these engines may adjust the presentation layer to match source-to-destination security. Secured information may be transmitted with encrypted security tags (e.g., FIG. 4)—these tags may be used to segregate the packets delivered to the devices of the users. As shown in FIG. 4, there may be a security manifest 140 that includes one or more security tags associated with one or more digital objects. The security tag may include an object identifier (e.g., object 115) and one or more authenticated user identifiers associated with one or more devices (e.g., laptop 102). The one or more authenticated user IDs may be of the presenters of the presentation. In addition, under the security tag for example, there may be a description 142 of object 115, there may be a general permission for the security level associated with object 115, or there may be more permissions (security levels) for segments of object 115 that further restrict object 115, among other things. With reference to the segments of the object 115, separately, image instruction 144 of object 115 may have a display permission and level of encryption, voice instruction 145 of object 115 may have audio permission and level of encryption, text instruction 146 may have text permission and level of encryption, or there may be other fields 147. In a client/server configuration, the server 101 (e.g., web server) may provide the security manifest and APIs so that the devices (e.g., tablet 105) can manage and customize the presentation layer for each client. APIs may help build the security manifest, providing rules, logic engine, and downloadable scripts that manage each security presentation object. Upstream policy-based systems may modify the security manifest in near real-time.

The object-managed secured multicast may be used to assist in more efficiently multicasting content to users with different security levels. Server 101 may direct security manifests that are tailored. Instead of just one or two security levels, this allows for three or more security levels, which may be highly individualized. For example, when applicable, details, such as names of personnel, types of equipment used, or number of troops, may only be displayed to those who have the appropriate security level or otherwise need to know. In a military operation scenario, it may beneficial that no one group has all the details, but only the details of an operation that they need to know. This may reduce the risk that an operation may fall into the wrong hands and increase the likelihood of operation success.

Figure 5:
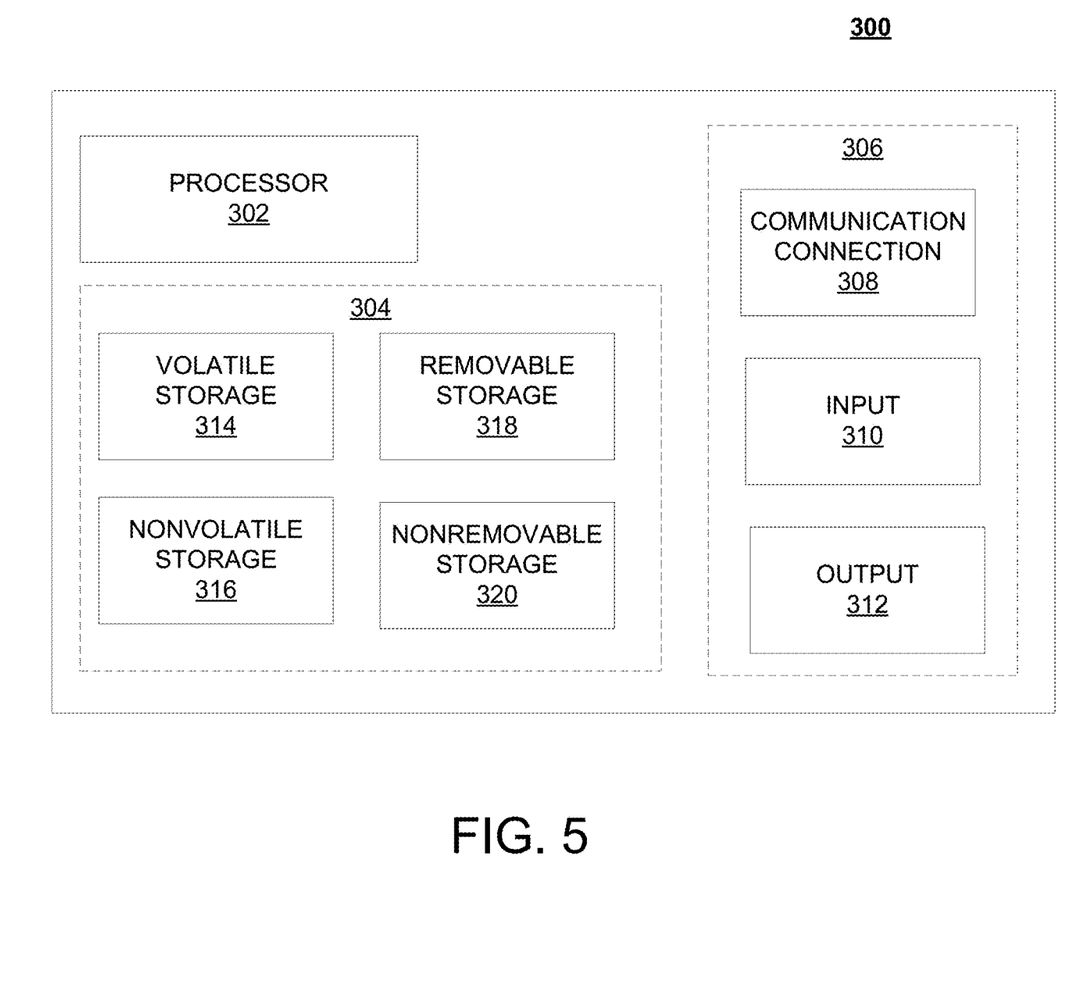
FIG. 5 illustrates a schematic of an exemplary network device.

FIG. 5 is a block diagram of network device 300 that may be connected to or comprise a system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
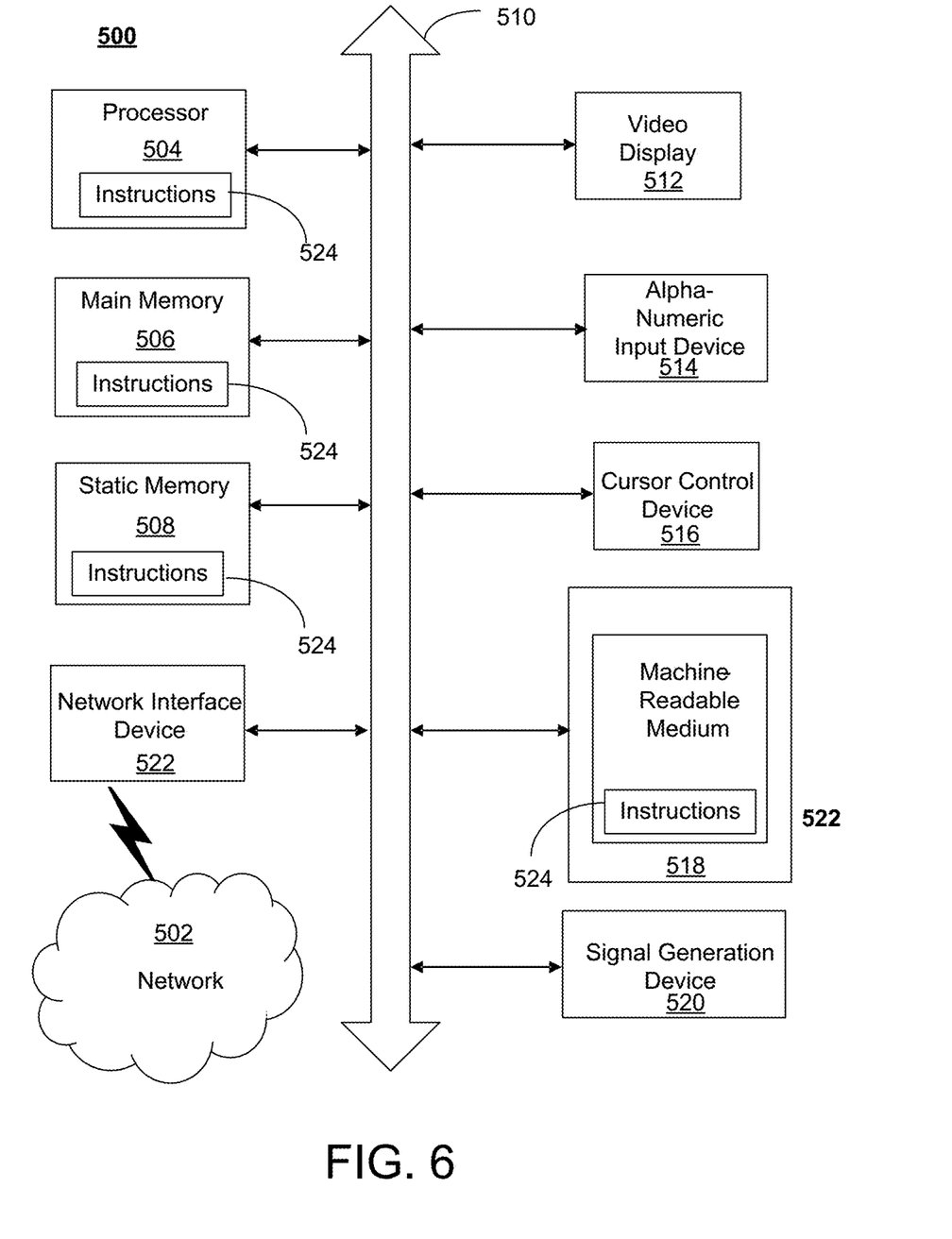
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 103, tablet 104, tablet 105, server 101, and other devices of FIG. 1 and FIG. 8. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
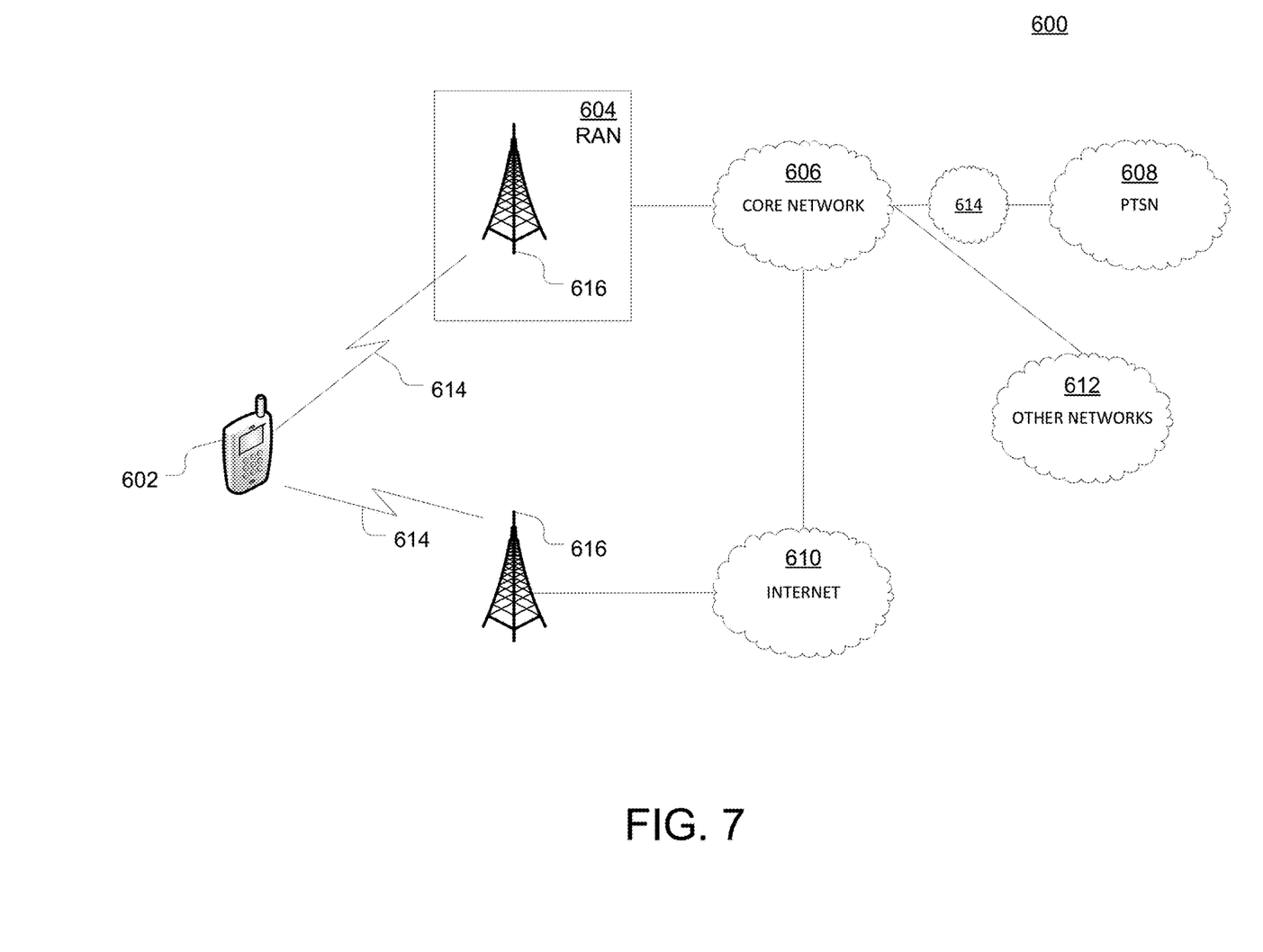
FIG. 7 illustrates an exemplary telecommunications system in which the disclosed methods and processes may be implemented.

As shown in FIG. 7, telecommunication system 600 (which may virtual or non-virtual) may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise tablet 104, mobile device 103, laptop 102, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 8:
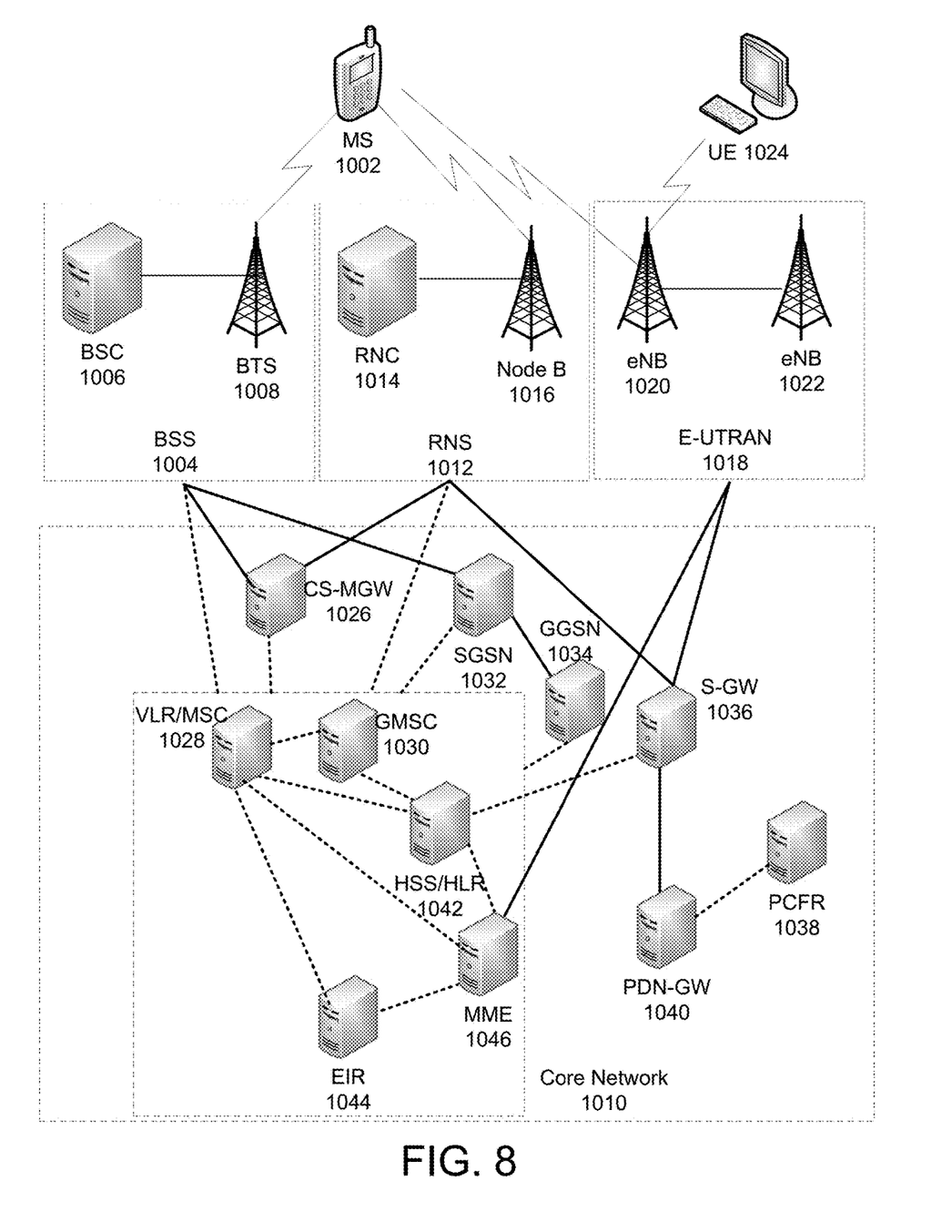
FIG. 8 is a block diagram of an exemplary public land mobile network (PLMN).

FIG. 8 illustrates a PLMN block diagram view of an example architecture of a telecommunications system that may be used by system 100. In FIG. 8, solid lines may represent user traffic signals, and dashed lines may represent support signaling. MS 1002 is the physical equipment used by the PLMN subscriber. For example, tablet 105, network device 300, mobile device 103, laptop 102, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile phone, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface that provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which object-managed secured multicast can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—object-managed secured multicast—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. It is contemplated that elements of this may be done in a point-to-point manner rather than multicast. It is also contemplated that server 101 may edit or filter the streaming presentation before it is sent to the user. With this editing or filtering it is understood that this may be considered a modified multicast operation. The streaming presentation may still sent approximately simultaneously to multiple end devices (e.g., tablet 104 and tablet 105) with slight (to significant) alterations.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for object-managed secured multicast. A method, system, computer readable storage medium, or apparatus may generate a plurality of digital objects for an online presentation, wherein the plurality of digital objects comprises a first digital object and a second digital object; associate the first digital object with a first security level; associate the second digital object with a second security level, and multicasting the plurality of digital objects for the online presentation. The first security level and the second security level may be different. The first security level and the second security level may provide for different permissions for accessing the first digital object and the second digital object. The first digital object may include video, audio, a still image, text, or multimedia. The apparatus may be a mobile device in point-to-multipoint peer-to-peer situations or a server. The method, system, computer readable storage medium, or apparatus may obtain the security level of a first end device of a plurality of end devices and alter, based on the security level of the first end device, information to be displayed on the first end device, which is an example in which the server may do the security level filtering rather than the end device. All combinations in this paragraph and throughout (including the removal or addition of steps) are contemplated in a manner that is consistent with the other portions of the detailed description.

What is claimed:

1. An apparatus comprising:
a processor; and
a memory coupled with the processor, the memory comprising executable instructions that when executed by the processor cause the processor to effectuate operations comprising:
generating a plurality of digital objects for an online presentation, wherein the plurality of digital objects comprises a first digital object and a second digital object;
associating the first digital object with a first security level;
associating the second digital object with a second security level,
wherein the first security level and the second security level provide for different permissions for displaying the first digital object and the second digital object, wherein the second security level of the second digital object is determined based on image recognition, time, or near real-time geographical position; and
transmitting the plurality of digital objects for the online presentation to a plurality of end devices to be displayed on each end device of the plurality of end devices, the plurality of end devices comprising a first end device and a second end device,
the first digital object and the second digital object, on the first device, is displayed so as to represent respectively first information and second information about the first digital object and the second digital object,
the first digital object and the second digital object, on the second device, is displayed so as to represent respectively third information and fourth information about the first digital object and the second digital object, wherein the first information is different from the third information, and
the first information and the second information are based on the first security level and the third information and the fourth information are based on the second security level.

2. The apparatus of claim 1, wherein the first digital object comprises video.

3. The apparatus of claim 1, wherein the first digital object comprises a still image.

4. The apparatus of claim 1, wherein the first digital object comprises text.

5. The apparatus of claim 1, wherein the first digital object comprises multimedia.

6. The apparatus of claim 1, wherein the apparatus is a mobile device.

7. The apparatus of claim 1, wherein the apparatus is a server.

8. The apparatus of claim 1, the operations further comprising:
obtaining a security level of a first end device of the plurality of end devices; and
altering, based on the security level of the first end device, information to be displayed on the first end device.

9. A system comprising:
a plurality of end devices; and
a server communicatively connected with the plurality of end devices, wherein the server comprises
a processor; and
a memory coupled with the processor, the memory comprising executable instructions that when executed by the processor cause the processor to effectuate operations comprising:
generating a plurality of digital objects for an online presentation, wherein the plurality of digital objects comprises a first digital object and a second digital object;
associating the first digital object with a first security level;
associating the second digital object with a second security level, wherein the first security level and the second security level provide for different permissions for displaying the first digital object and the second digital object, wherein the second security level of the second digital object is determined based on time or near real-time geographical position; and transmitting the plurality of digital objects for the online presentation to the plurality of end devices to be displayed on each end device of the plurality of end devices, the plurality of end devices comprising a first end device and a second end device, the first digital object and the second digital object, on the first device, is displayed so as to represent respectively first information and second information about the first digital object and the second digital object, the first digital object and the second digital object, on the second device, is displayed so as to represent respectively third information and fourth information about the first digital object and the second digital object, wherein the first information is different from the third information, and the first information and the second information are based on the first security level and the third information and the fourth information are based on the second security level.

10. The system of claim 9, wherein the first digital object comprises video.

11. The system of claim 9, wherein the first digital object comprises a still image.

12. The system of claim 9, wherein the first digital object comprises text.

13. The system of claim 9, wherein the first digital object comprises multimedia.

14. The system of claim 9, the operations further comprising:
obtaining a security level of a first end device of the plurality of end devices; and
altering, based on the security level of the first end device, information to be displayed on the first end device.

15. A method comprising:
generating a plurality of digital objects for an online presentation, wherein the plurality of digital objects comprises a first digital object and a second digital object;
associating the first digital object with a first security level;
associating the second digital object with a second security level,
wherein the first security level and the second security level provide for different permissions for accessing the first digital object and the second digital object, wherein the second security level of the second digital object is determined based on audio recognition; and transmitting the plurality of digital objects for the online presentation to a plurality of end devices to be displayed on each end device of the plurality of end devices, the plurality of end devices comprising a first end device and a second end device, the first digital object and the second digital object, on the first device, is displayed so as to represent respectively first information and second information about the first digital object and the second digital object, the first digital object and the second digital object, on the second device, is displayed so as to represent respectively third information and fourth information about the first digital object and the second digital object, wherein the first information is different from the third information, and the first information and the second information are based on the first security level and the third information and the fourth information are based on the second security level.

16. The method of claim 15, wherein the first digital object comprises video.

17. The method of claim 15, wherein the first digital object comprises a still image.

18. The method of claim 15, wherein the first digital object comprises text.

19. The method of claim 15, wherein the first digital object comprises multimedia.

20. The method of claim 15, further comprising:
obtaining a security level of a first end device of the plurality of end devices; and
altering, based on the security level of the first end device, information to be displayed on the first end device.

* * * * *